(12) United States Patent
Chen et al.

(10) Patent No.: US 10,844,171 B2
(45) Date of Patent: Nov. 24, 2020

(54) PRODUCTION METHOD OF SEMI-AROMATIC POLYAMIDE, AND SEMI-AROMATIC POLYAMIDE

(71) Applicants: ZHEJIANG NHU SPECIAL MATERIALS CO., LTD., Shaoxing (CN); Zhejiang University, Hangzhou (CN); ZHEJIANG NHU COMPANY LTD., Shaoxing (CN)

(72) Inventors: Zhirong Chen, Hangzhou (CN); Hong Yin, Hangzhou (CN); Qin Zhang, Shaoxing (CN); Xiaoxiao Wu, Shaoxing (CN); Wengang Hong, Shaoxing (CN); Hangjun Deng, Shaoxing (CN); Guiyang Zhou, Shaoxing (CN); Changze Wang, Shaoxing (CN)

(73) Assignees: Zhejiang Nhu Special Materials Co., Ltd., Zhejiang (CN); Zhejiang University, Zhejiang (CN); Zhejiang Nhu Company Ltd., Shaoxing (CN)

(*) Notice: Subject to any disclaimer, the term of this patent is extended or adjusted under 35 U.S.C. 154(b) by 180 days.

(21) Appl. No.: 15/779,414

(22) PCT Filed: Jun. 29, 2017

(86) PCT No.: PCT/CN2017/090830
§ 371 (c)(1),
(2) Date: May 25, 2018

(87) PCT Pub. No.: WO2018/120702
PCT Pub. Date: Jul. 5, 2018

(65) Prior Publication Data
US 2020/0055985 A1    Feb. 20, 2020

(30) Foreign Application Priority Data
Dec. 28, 2016    (CN) .......................... 2016 1 1239093

(51) Int. Cl.
*C08L 77/08*    (2006.01)
*C08G 69/28*    (2006.01)
*C08G 69/26*    (2006.01)

(52) U.S. Cl.
CPC ........... *C08G 69/28* (2013.01); *C08G 69/265* (2013.01); *C08L 77/08* (2013.01)

(58) Field of Classification Search
CPC ........ C08G 69/04; C08G 69/265; C08L 77/00
See application file for complete search history.

(56) References Cited

U.S. PATENT DOCUMENTS

| | | | |
|---|---|---|---|
| 4,603,166 A | 7/1986 | Poppe et al. | |
| 4,603,193 A | 7/1986 | Richardson et al. | |
| 4,617,342 A | 10/1986 | Poppe et al. | |
| 4,742,110 A | 5/1988 | Sakashita et al. | |
| 5,175,238 A | 12/1992 | Matlack et al. | |
| 5,849,826 A * | 12/1998 | Ogo | C08G 69/265 524/410 |
| 2006/0122360 A1 | 6/2006 | Tsujii et al. | |
| 2011/0028614 A1 * | 2/2011 | Shikano | C08G 69/28 524/126 |
| 2014/0296472 A1 * | 10/2014 | Kaushiva | C08G 69/28 528/335 |

FOREIGN PATENT DOCUMENTS

| | | |
|---|---|---|
| CN | 1166844 | 12/1997 |
| CN | 1678660 | 10/2005 |
| CN | 105377948 | 3/2016 |
| WO | WO 9616107 | 5/1996 |

* cited by examiner

*Primary Examiner* — Gregory Listvoyb
(74) *Attorney, Agent, or Firm* — Fish & Richardson P.C.

(57) ABSTRACT

The present disclosure provides a production method of a semi-aromatic polyamide, and a semi-aromatic polyamide. Said production method of a semi-aromatic polyamide includes: step 1 of subjecting an initial charge of a diamine and a binary acid in an amine/acid molar ratio of less than 1.0 to form a slurry together with water and a catalyst, and subjecting the slurry to heating and dissolution to form a saline solution; step 2 of dehydrating said saline solution after detecting the composition thereof, detecting the content of diamine in a steam condensate from a dehydration unit, adjusting the amine/acid molar ratio to be larger than 1.0 by a molten diamine and a monoacid as a molecular weight regulator, and performing pre-polymerization; and step 3 of subjecting a pre-polymerization solution to post-polycondensation after vacuum flashing. The semi-aromatic polyamide of the present disclosure has a low gel content, excellent performance and extensive scope of application.

16 Claims, 2 Drawing Sheets

PRODUCTION METHOD OF SEMI-AROMATIC POLYAMIDE, AND SEMI-AROMATIC POLYAMIDE

CROSS-REFERENCE TO RELATED APPLICATIONS

This application is a U.S. national stage application under 35 USC § 371 of International Application No. PCT/CN2017/090830, filed on Jun. 29, 2017, which claims priority to CN Patent Application No. 201611239093.9, filed on Dec. 28, 2016, the entire contents of which are incorporated herein by reference.

TECHNICAL FIELD

The present disclosure relates to a production method of a semi-aromatic polyamide, and a semi-aromatic polyamide, particularly a continuous production method of a low-gel semi-aromatic polyamide.

BACKGROUND

A semi-aromatic polyamide is usually a polyamide with a benzene ring, obtained by subjecting an aromatic dibasic acid, an aliphatic dibasic acid and an aliphatic diamine to polycondensation. Due to the introduction of an aromatic ring structure in the main chain, the semi-aromatic polyamide has good heat resistance and mechanical properties, low water absorption, and has proper cost performance, thus filling the gap between the general engineering plastics and high temperature-resistant engineering plastics PEEK, and is applicable to the field such as electronics, electrical appliances, automobiles, clothing fibers, and the like.

The preparation of semi-aromatic polyamide usually uses a pre-polymerization-post-polycondensation process, wherein the pre-polymerization usually uses water as a reaction solvent, and a binary acid and a diamine are firstly neutralized in a salt-forming kettle to form a saline solution, and then heated to a certain temperature for dehydration and pre-polymerization to obtain a prepolymer aqueous solution, which is subjected to vacuum flashing to obtain a prepolymer solid or melt; the prepolymer is further subjected to solid phase or melt post-polycondensation to obtain a semi-aromatic polyamide product having a certain molecular weight. In order to stabilize the product quality, it is generally desired to use a continuous production process.

In U.S. Pat. Nos. 4,603,166, 4,603,193 and 4,617,342, a method of synthesizing a semi-aromatic polyamide by firstly forming an aromatic dibasic acid, an aliphatic dibasic acid, an aliphatic diamine, a catalyst and a molecular weight regulator into salts in batches together and then subjecting them to pre-polymerization, flashing, melt post-polycondensation continuously is described. This method adopts high temperature and short residence time during pre-polymerization, material is directly subjected to melt post-polycondensation after flashing, thereby improving the production efficiency.

In CN105377948A, a method of synthesizing a semi-aromatic polyamide by firstly forming a terephthalic acid and an isophthalic acid in different proportions, an aliphatic diamine, a catalyst and a molecular weight regulator into salts in batches together, and then subjecting them to pre-polymerization, flashing and melt post-polycondensation continuously is described. In this method, the material after pre-polymerization is directly subjected to flashing to obtain a prepolymer, and the prepolymer is directly subjected to melt post-polycondensation to obtain a semi-aromatic polyamide. In order to compensate for the loss of the diamine during flashing, this method requires high amine/acid ratio in the salt-forming process.

In CN1678660A, a process for continuous production of polyamide is described. When a semi-aromatic polyamide is produced, an aromatic dibasic acid, an aliphatic dibasic acid, an aliphatic diamine, a catalyst and a molecular weight regulator are firstly formed into salts in batches together, and then subjected to continuous pipeline pre-polymerization, kettle dehydration pre-polymerization, and melt post-polycondensation to obtain the product. In this method, the material is directly subjected to melt post-polymerization after pre-polymerization. Meanwhile, the amount of the blocking agent is adjusted according to the viscosity of the outlet of the melt polycondensation reactor to achieve the purpose of stabilizing the viscosity of the polyamide.

In CN1166844A, a process for the continuous production of polyamide is described, which is a method of preparing polyamide by introducing the molten acid-rich component mainly consisted of aliphatic dibasic acids from the top of a vertical multi-stage reactor and the vapor of an aliphatic diamine from the bottom of the vertical multi-stage reactor, and conducting countercurrent continuous polycondensation in the reactor. In this method, a near infrared analyzer is equipped near the outlet of the reactor, which can analyze the proportion of the terminal amine group and the terminal carboxyl group online and adjust the material proportion accordingly. Since the feed must be in a molten state, this method is mainly used for the preparation of nylon 6,6, and is also not suitable for semi-aromatic polyamides with the aromatic dibasic acid content exceeding 50%.

To sum up, the existing production processes for semi-aromatic polyamides still have the following problems:

(1) Since the melting point of the aromatic dibasic acid exceeds its decomposition temperature, in the processes reported in the existing literatures, the salt-forming reactions are carried out in batches, and the ratio of the dibasic acid to the diamine in each batch of saline solutions is required to be determined by sampling analysis and then adjusted according to the determination result, which makes the pre-polymerization impossible to achieve a substantial continuity.

(2) The existing online test methods can only quantitatively analyze the content of the terminal carboxyl group and the terminal amine group, and are unable to analyze the composition of the raw materials. Therefore, the automatic control of the feeding process cannot be achieved.

(3) The loss of the amine and acid in the dehydration process cannot be continuously quantified, and thus cannot be adjusted automatically according to the actual amine/acid ratio of the dehydrated material to stabilize the pre-polymerization.

(4) The retardation time adjusted according to the content of the terminal groups at the outlet of pre-polymerization or polycondensation is long, and the amine/acid ratio is liable to generate fluctuation during the adjustment. However, a too much high amine/acid ratio tends to result in a side effect of gelation, thereby reducing the quality of the product.

SUMMARY

In view of the aforementioned problems, the present disclosure provides a production method of polyamide, and a polyamide with low gel content, particularly a method of continuous production of a semi-aromatic polyamide with low gel content.

The first aspect of the present disclosure provides a production method of a semi-aromatic polyamide, comprising:

step 1 of subjecting an initial charge of a diamine and a binary acid in an amine/acid molar ratio of less than 1.0 to form a slurry together with water and a catalyst, and subjecting the slurry to heating and dissolution to form a saline solution;

step 2 of dehydrating said saline solution after detecting the composition thereof, detecting the content of diamine in a steam condensate from a dehydration unit, adjusting the amine/acid molar ratio to be larger than 1.0 by diamine and a monoacid as a molecular weight regulator, and performing pre-polymerization; and step 3 of subjecting the pre-polymerization solution to post-polycondensation after vacuum flashing.

According to the aforementioned method, the amine/acid molar ratio of the initial charge in said step 1 is from 0.90 to 0.99, preferably from 0.92 to 0.98.

According to the aforementioned method, said binary acid comprises aromatic dibasic acid and aliphatic dibasic acid, the molar ratio of said aromatic dibasic acid to said aliphatic dibasic acid is 100:0 to 40:60, preferably 100:0 to 50:50.

According to the aforementioned method, said aliphatic dibasic acid is one or more selected from succinic acid, glutaric acid, adipic acid, suberic acid, azelaic acid, sebacic acid and dodecanedioic acid; and said aromatic dibasic acid is one or more selected from isophthalic acid, terephthalic acid and naphthalene dicarboxylic acid.

According to the aforementioned method, said diamine is one or more selected from hexamethylenediamine, heptamethylenediamine, octamethylenediamine, nonamethylenediamine, decamethylenediamine, 2-methylpentamethylenediamine, undecamethylenediamine, dodecamethylenediamine or xylylenediamine, preferably, said diamine is one or more selected from hexamethylenediamine, octamethylenediamine or decamethylenediamine.

According to the aforementioned method, said monoacid as the molecular weight regulator is one or more selected from acetic acid, propionic acid, butyric acid, valeric acid, caproic acid, octanoic acid, capric acid, lauric acid, palm acid, palmitic acid, stearic acid, benzoic acid or phenylacetic acid.

According to the aforementioned method, the mole number of said monoacid as the molecular weight regulator is from 0.1 to 5%, preferably from 0.5 to 3% relative to the total mole number of the binary acid in the initial charge.

According to the aforementioned method, the mass of said catalyst is from 0.01 to 2.5% relative to the total mass of the binary acid in the initial charge.

According to the aforementioned method, said step 1 further comprises a step of detecting the composition of the binary acid in said saline solution and keeping the composition of the binary acid stable by adding an aromatic dibasic acid and/or an aliphatic dibasic acid.

According to the aforementioned method, the detection in said step 1 uses online Raman spectroscopy.

According to the aforementioned method, the detection in said step 2 uses online Raman spectroscopy.

According to the aforementioned method, the amine/acid molar ratio in said step 2 is from 1.005 to 1.05, preferably from 1.01 to 1.04.

According to the aforementioned method, the temperature of the dehydration is 170-260° C., the pressure is 0.7-2.0 MPa, and the dehydration time is 10-40 min.

According to the aforementioned method, the temperature of said pre-polymerization is 250-350° C., the pressure is 10-30 MPa, and the reaction time is 1-15 min.

According to the aforementioned method, the reaction temperature of said post-polycondensation is 300-350° C., and the reaction time is 0.5-5 min.

According to the aforementioned method, steam generated from the dehydration procedure in said step 2 can be used as a heat source for the heating and dissolution of a slurry, and excessive steam can be combined after condensation with a condensate generated from a heating procedure as supplementary water for use in the procedure of forming a slurry.

The second aspect of the present disclosure provides a semi-aromatic polyamide, which is prepared according to the aforementioned method, and has a gel content of 1.0% or less, preferably 0.8% or less.

The third aspect of the present disclosure provides a semi-aromatic polyamide, which is obtained by subjecting a binary acid and an aliphatic diamine to polycondensation, said binary acid comprises aromatic dibasic acid and aliphatic dibasic acid, the molar ratio of said aromatic dibasic acid to said aliphatic dibasic acid is 100:0 to 40:60, preferably 100:0 to 50:50; the gel content of which is 1.0% or less, preferably 0.8% or less.

According to the aforementioned semi-aromatic polyamide, said aliphatic dibasic acid is one or more selected from succinic acid, glutaric acid, adipic acid, suberic acid, azelaic acid, sebacic acid, and dodecanedioic acid; said aromatic dibasic acid is one or more selected from isophthalic acid, terephthalic acid and naphthalene dicarboxylic acid.

According to the aforementioned semi-aromatic polyamide, said diamine is one or more selected from hexamethylenediamine, heptamethylenediamine, octamethylenediamine, nonamethylenediamine, decamethylenediamine, 2-methylpentamethylenediamine, undecamethylenediamine, dodecamethylenediamine and xylylenediamine, preferably, said diamine is one or more selected from hexamethylenediamine, octamethylenediamine and decamethylenediamine.

According to aforementioned semi-aromatic polyamide, the intrinsic viscosity of said semi-aromatic polyamide is from 0.7 to 1.0 dl/g.

Studies of the inventors of the present disclosure have shown that in the production method of a semi-aromatic polyamide, ensuring that the amine/acid molar ratio in the system is less than 1.0 in the procedures of forming slurry, dissolving and salt-forming as well as dehydration, and properly controlling the time of the dehydration, pre-polymerization and post-polycondensation can reduce the degree of gelation. In a specific embodiment of the present disclosure, the resulting semi-aromatic polyamide has a low gel content, good fluidity, high mechanical strength, and is adaptable to the requirements of different post-processing procedures.

In a specific embodiment of the present disclosure, the steam generated from the dehydration procedure is used for the heating of the process of dissolving and salt-forming, which can reduce the energy consumption of the process; the excessive steam can be combined after condensation with the condensate generated from the heating procedure as supplementary water for use in the procedure of forming a slurry, thereby reducing the discharge of process wastewater.

In a specific embodiment of the present disclosure, the proportion of respective raw materials can be adjusted in the production process according to the actual situation by the online detection of the composition (including the amine/acid molar ratio) of the saline solution prior to dehydration and the content of the diamine in the steam condensate from the dehydration unit. For example, according to the detection results of Raman spectroscopy, the composition of the reaction material can be continuously fine-tuned with the molten aliphatic dibasic acid as well as the aromatic dibasic acid slurry and the molten diamine, thereby achieving complete continuity of the production process; while adding the molecular weight regulator after dehydration can avoid the loss caused by dehydration, so as to achieve the purpose of precisely controlling the proportion. In a specific embodiment of the present disclosure, the content of each component is continuously determined quantitatively when the amine/acid ratio is less than 1.0 using the multi-channel online Raman spectroscopy according to the characteristic Raman absorption peaks of different raw materials, thus being able to continuously adjust the proportion of raw materials in the production process and stabilize the production process.

In a specific embodiment of the present disclosure, the production process can be completely continuous with low energy consumption; the resulting product has a low gel content, excellent performance, and extensive scope of application.

DESCRIPTION OF REFERENCE SIGNS

1: Stock bin of aliphatic dibasic acid
2, 4, 6: Feed screw conveyor
3: Stock bin of terephthalic acid
5: Stock bin of isophthalic acid (or other binary acids)
7: Storage tank of the aqueous solution of a catalyst
8, 10, 12, 13, 17, 23, 24, 26, 28, 30, 32: Pump
9: Beating slurry vessel
11: Storage tank of the molten diamine
14: Multi-stage stirring vessel
15, 27, 33, 44, 49: Heat exchanger
16, 18, 20: Online Raman spectroscopic detector
19: Dissolving and salt-forming kettle
21: Controller
22: Storage tank of the molten aliphatic dibasic acid
25: Stock bin of the isophthalic acid (or other binary acids) slurry
29, 46: Dehydrater
31: Storage tank of the molten monoacid
34, 50: Pre-polymerization reactor
35, 37, 51, 53: Reducing valve
36, 52: Flash vaporizer
38, 54: Post-polycondensation reactor (double-screw extruder)
39, 55: Pelletizer
40, 56: Drier
41, 42: Salt-forming kettle
43: Delivery pump of the saline solution
45: Circulating pump
47: Condenser
48: Feed pump for the dehydrated material

DETAILED DESCRIPTION

The first aspect of the present disclosure is to provide a production method of a semi-aromatic polyamide, comprising:

step 1 of subjecting an initial charge of a diamine and a binary acid in an amine/acid molar ratio of less than 1.0 to form a slurry together with water and a catalyst, and subjecting the slurry to heating and dissolution to form a saline solution;

step 2 of dehydrating said saline solution after detecting the composition thereof, detecting the content of diamine in a steam condensate from a dehydration unit, adjusting the amine/acid molar ratio to be larger than 1.0 by a molten diamine and a monoacid as a molecular weight regulator, and performing pre-polymerization; and step 3 of subjecting a pre-polymerization solution to post-polycondensation after vacuum flashing.

Said binary acid comprises aromatic dibasic acid and aliphatic dibasic acid, and the molar ratio between them is 100:0 to 40:60, preferably 100:0 to 50:50.

Said aliphatic dibasic acid is one or more selected from succinic acid, glutaric acid, adipic acid, suberic acid, azelaic acid, sebacic acid and dodecanedioic acid, preferably one or more selected from adipic acid, suberic acid, sebacic acid and dodecanedioic acid; said aromatic dibasic acid is one or more selected from isophthalic acid, terephthalic acid and naphthalene dicarboxylic acid, preferably one or more of isophthalic acid and terephthalic acid.

Said diamine is one or more selected from hexamethylenediamine, heptamethylenediamine, octamethylenediamine, nonamethylenediamine, decamethylenediamine, 2-methylpentamethylenediamine, undecamethylenediamine, dodecamethylenediamine and xylylenediamine, preferably, said diamine is one or more selected from hexamethylenediamine, octamethylenediamine and decamethylenediamine.

Said monoacid as the molecular weight regulator is one or more selected from acetic acid, propionic acid, butyric acid, valeric acid, caproic acid, octanoic acid, capric acid, lauric acid, palm acid, palmitic acid, stearic acid, benzoic acid or phenylacetic acid. The molar weight of the added molecular weight regulator is from 0.1 to 5%, preferably from 0.5 to 3%, relative to the total molar weight of the dicarboxylic acid as the raw material.

Said amine/acid molar ratio of the initial charge is less than 1.0, preferably from 0.90 to 0.99, more preferably from 0.92 to 0.98.

Said production method of a semi-aromatic polyamide can use a phosphorus-based compound as a catalyst. Phosphorus-based compounds include, for example, phosphoric acid, phosphorous acid, hypophosphorous acid and the salts or ester derivatives thereof, such as phosphoric acid, phosphorous acid or hypophosphorous acid, or the sodium, potassium, magnesium, vanadium, calcium, zinc, cobalt, manganese, tin, tungsten, germanium, titanium or antimony salts of phosphoric acid, phosphorous acid or hypophosphorous acid; ammonium phosphate, ammonium phosphite and ammonium hypophosphate; the ethyl ester, isopropyl ester, butyl ester, hexyl ester, isodecyl ester, octadecyl ester, decyl ester, octadecanoyl ester or phenyl ester of phosphoric acid, phosphorous acid or hypophosphorous acid.

Said catalyst is preferably one or more selected from sodium phosphate, potassium phosphate, sodium phosphite, potassium phosphite, sodium hypophosphite and potassium hypophosphite. The mass of said catalyst is from 0.01 to 2.5%, preferably from 0.05 to 1%, relative to the total mass of the binary acid in the initial charge.

In a specific embodiment of the present disclosure, said step 1 further comprises a step of detecting the composition of the binary acid in said saline solution and keeping the composition of the binary acid stable by adding an aromatic dibasic acid and/or an aliphatic dibasic acid. For instance, use the online Raman spectroscopy to detect and obtain the composition of the binary acid in the saline solution, and the composition of the binary acid in the saline solution is adjusted by the molten aliphatic dibasic acid and/or aromatic dibasic acid slurry according to the detection results to keep the composition stable.

In a specific embodiment of the present disclosure, the amine/acid molar ratio in the saline solution prior to dehydration and the content of the diamine in the steam condensate from the dehydration unit are detected by the online Raman spectroscopy, and the amine/acid molar ratio is adjusted to be greater than 1.0 with the diamine and the monoacid as the molecular weight regulator according to the detection results. Said adjusting the amine/acid molar ratio to be greater than 1.0 with the diamine and the monoacid as the molecular weight regulator means that the adjusted amine/acid molar ratio of the aliphatic diamine to the sum of the aliphatic dibasic acid, the aromatic dibasic acid and the monoacid as the molecular weight regulator is controlled to be greater than 1.0, preferably from 1.005 to 1.05, more preferably from 1.01 to 1.04.

In a specific embodiment of the present disclosure, a production method of a semi-aromatic polyamide is provided, and further, a continuous production method of a semi-aromatic polyamide is provided. For example, use the online Raman spectroscopy to detect and obtain the composition of the binary acid in the saline solution, and adjust the composition of the binary acid in the saline solution by the molten aliphatic dibasic acid and/or aromatic dibasic acid slurry according to the detection results to keep the composition stable. Moreover, detect the amine/acid molar ratio in the material prior to dehydration and the content of the diamine in the steam condensate from the dehydration unit by the online Raman spectroscopy, and adjust the amine/acid molar ratio to be greater than 1.0 with the diamine and the monoacid as the molecular weight regulator according to the detection results.

The steam generated from the dehydration stage can be used as the heat source for the heating and dissolution process of a slurry, and the excessive steam can be combined after condensation with the condensate generated from the heating procedure as supplementary water for use in the procedure of forming a slurry.

In a specific embodiment of the present disclosure, in the procedure of forming a slurry, the moisture content of the system can be from 10 to 50%, preferably from 15 to 30%, and the temperature can be from 50 to 95° C., preferably from 60 to 90° C. The temperature of dissolving into salt can be from 120 to 170° C., preferably from 130 to 160° C. In the dehydration procedure, the temperature of the dehydration can be from 170 to 260° C., preferably from 190 to 240° C.; the pressure can be from 0.7 to 2.0 MPa, preferably from 1.0 to 1.8 MPa; the dehydration time can be from 10 to 40 min, preferably from 15 to 30 min; the moisture content after dehydration is from 5 to 20%, preferably from 7 to 15%.

In a specific embodiment of the present disclosure, the pre-polymerization temperature can be from 250 to 350° C., preferably from 280 to 340° C.; the pressure can be from 10 to 30 MPa, preferably from 15 to 25 MPa; the reaction time can be from 1 to 15 min, preferably from 2 to 10 min. After the pre-polymerization, the pressure of vacuum flashing can be from 0.15 to 0.9 MPa, preferably from 0.2 to 0.6 MPa, and the temperature can be the same as that of pre-polymerization. After the vacuum flashing, the prepolymer enters the double-screw extruder as a melt and is subjected to post-polycondensation, the reaction temperature can be from 300 to 350° C., preferably from 310 to 340° C.; and the reaction time can be from 0.5 to 5 min, preferably from 1 to 3 min.

In a specific embodiment of the present disclosure, the diamine along with the aliphatic dibasic acid and the aromatic dibasic acid with an amine/acid molar ratio of less than 1.0 in the initial charge, are pulped continuously together with water and a catalyst to form a slurry, and the slurry is heated by the vapor generated from the dehydration process via the preheater and dissolved into a salt. The saline solution is made to enter the dehydrator for heating and dehydration, and the material prior to the dehydration is detected by the online Raman spectroscopy, then the amine/acid molar ratio is adjusted to 1.005-1.05 with the molten diamine and the monoacid as the molecular weight regulator by combining the online Raman spectroscopic analysis results of the diamine in the steam condensate generated in the dehydration process; followed by entering the pre-polymerization reactor for heating and pre-polymerization. The pre-polymerization solution enters the double-screw extruder for post-polycondensation after the vacuum flashing, followed by the underwater pelleting and drying to obtain a low-gel semi-aromatic polyamide product.

The second aspect of the present disclosure is to provide a semi-aromatic polyamide, the gel content of which is 1.0% or less, preferably 0.8% or less, more preferably 0.5% or less, most preferably 0.3% or less. Said semi-aromatic polyamide is produced by the production method provided in the first aspect of the present disclosure.

The third aspect of the present disclosure is to provide a semi-aromatic polyamide, which is obtained by subjecting a binary acid and an aliphatic diamine to polycondensation, said binary acid comprises aromatic dibasic acid and aliphatic dibasic acid, the molar ratio of said aromatic dibasic acid to said aliphatic dibasic acid is 100:0 to 40:60, preferably 100:0 to 50:50; the gel content of which is 1.0% or less, preferably 0.8% or less, more preferably 0.5% or less, most preferably 0.3% or less.

The intrinsic viscosity [η] of the semi-aromatic polyamide is preferably from 0.7 to 1.0 dL/g. If the intrinsic viscosity [η] is within the above range, the fluidity at the time of molding the resin composition containing the aforementioned semi-aromatic polyamide can be improved and the mechanical property of the resulting molded product becomes better. In addition, if the intrinsic viscosity [η] of the semi-aromatic polyamide is too low, the melting tension of the resin composition containing the same tends to be lower than the desired range.

EXAMPLES

In order to enable a person skilled in the art to better understand the technical solution of the present disclosure, the present disclosure will be further described below in combination with the following examples. However, it is understood that said examples are merely specific embodiments of the present disclosure and should not be understood as the limitations to the present disclosure. The percent in the examples is mass percent if not particularly specified. The properties in the examples and comparative examples are all measured as the following methods.

1. Intrinsic Viscosity

A sample was dissolved in a mixed solvent of phenol-tetrachloroethane (in a mass ratio of 3:2) to obtain a solution having concentrations of 0.1, 0.5 and 1.0 g/dL, and the logarithmic viscosity number $\eta_{ln}$ of the sample solution was measured with a Ubbelohde viscometer in a thermostatic waterbath at 30° C.

$$\eta_{ln}=[\ln(t/t_0)]/C \text{ (dL/g)}$$

Wherein $t_0$ was the elapsed time (sec) of the solvent; t was the elapsed time (sec) of the solution; and C was the concentration (g/dL) of the sample solution.

The data of $\eta_{ln}$ was extrapolated to the concentration of 0, the intrinsic viscosity [η] of the sample was thus obtained.

2. Detection of the Gel Content

Firstly, 0.25 g of polymer was weighed and put into a 25 ml volumetric flask, in which about 20 ml of 98% concentrated sulfuric acid was added, and then the volumetric flask was placed in a shaking bath at 50° C. for dissolution for 1 h. The volumetric flask was taken out, and the solution therein was filtered to a beaker with a sand core funnel G2; the resulting filtrate was slowly poured into water, and constantly stirred to precipitate the polymer; the polymer was filtered out, washed with water, dried, and weighed.

Gel content=(weight of the polymer before treatment−weight of the polymer after treatment)/weight of the polymer before treatment*100%

3. Raman Spectrum

Figure 1:
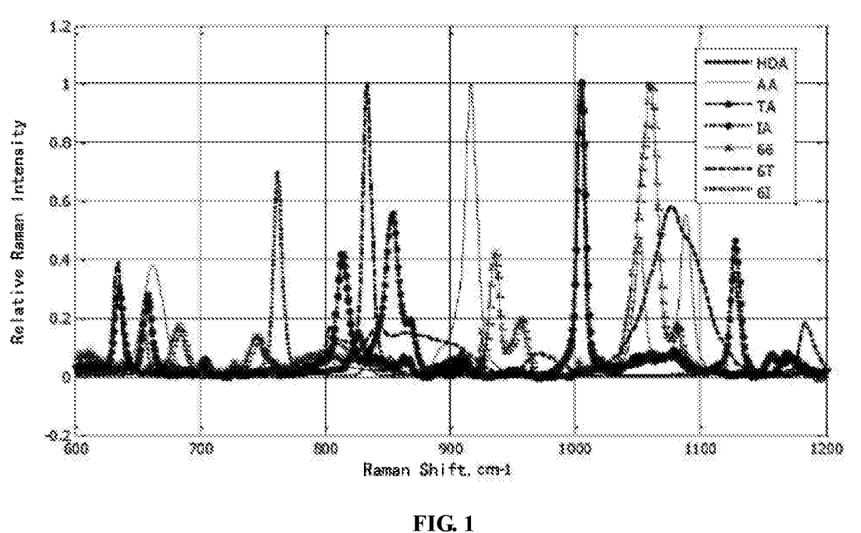
FIG. 1 shows the normalized Raman spectrums (600-1200 cm$^{-1}$) of various nylon salts.
Figure 2:
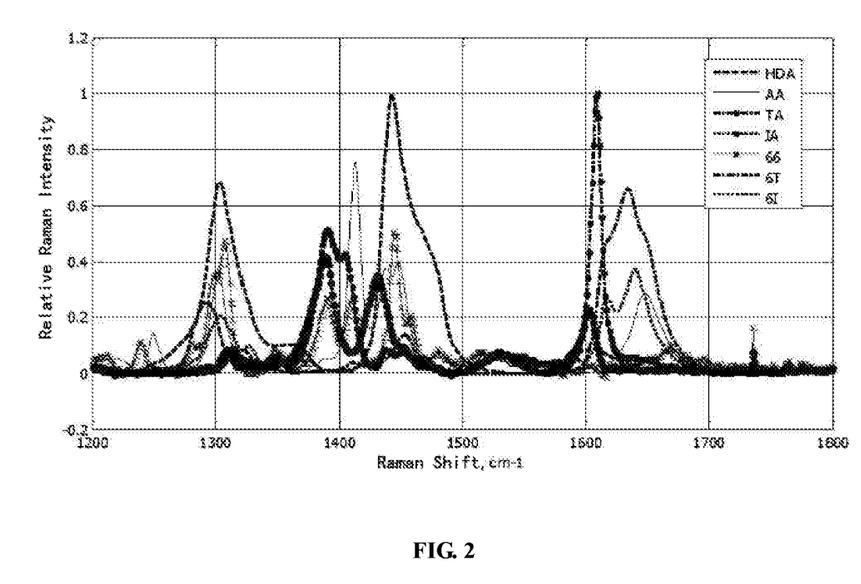
FIG. 2 shows the normalized Raman spectrums (1200-1800 cm$^{-1}$) of various nylon salts.

By the analysis and study of the Raman spectrum (see FIGS. 1 and 2) of terephthalic acid (TA), isophthalic acid (IA), adipic acid (AA) and hexamethylenediamine (HDA) after being mixed to form salts, the following Raman spectral information was used to determine the content of each component in the present disclosure:

(1) the content of isophthalic acid (IA) and a salt thereof (6I) was determined by the characteristic peaks at 1005 cm$^{-1}$ and 762 cm$^{-1}$;

(2) the content of terephthalic acid (TA) and a salt thereof (6T) was determined by the characteristic peaks at 1128 cm$^{-1}$ and 854 cm$^{-1}$;

(3) the content of adipic acid (AA) and a salt thereof (66) was determined by the characteristic peaks at 920 cm$^{-1}$ and 936 cm$^{-1}$;

(4) the content of hexamethylenediamine (HDA) was determined by the characteristic peak at 1485 cm$^{-1}$.

Figure 3:
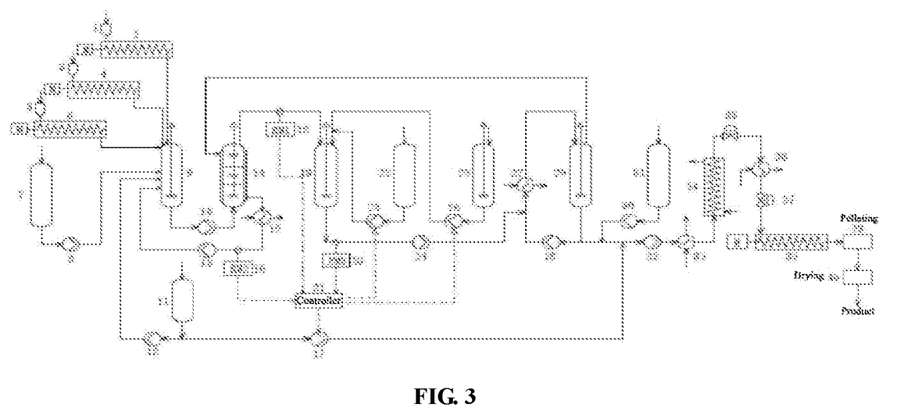
FIG. 3 shows the process flow chart of the Examples of the present disclosure.
Figure 4:
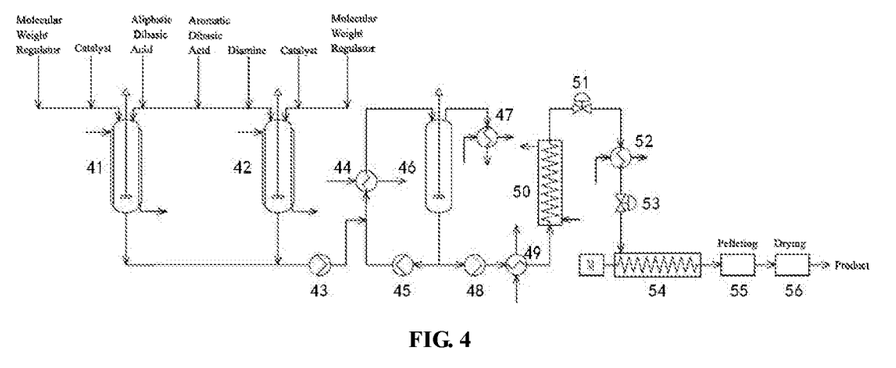
FIG. 4 shows the process flow chart of Comparative Examples 1-6.

Examples 1-6 were all carried out according to the flow chart of FIG. 3; all of the Comparative Examples were carried out according to the flow chart of FIG. 4. During the production process, all materials were subjected to deoxidation treatment with high-purity nitrogen gas, and all devices of the production process were purged and protected by high-purity nitrogen gas.

Example 1

In an amine/acid molar ratio of 0.95 in the initial charge, 4.15 Kg/h (25 mol/h) of terephthalic acid, 3.65 Kg/h (25 mol/h) of adipic acid, 5.51 Kg/h (47.5 Kmol/h) of hexamethylenediamine, 0.04 Kg/h of 20% aqueous solution of sodium hypophosphite and 3.2 Kg/h of water were fed together into a beating slurry vessel 9, and continuously pulped at 60° C. to form a slurry. The slurry was conveyed to a multi-stage stirring vessel 14 via a pump 10 and heated to 150° C. with the steam generated from the dehydration process to dissolve into a salt. The composition of the binary acid in the saline solution was detected by an online Raman spectrometer 18, and the amount of the aliphatic dibasic acid was adjusted by the molten adipic acid through a metering pump 23, so that the ratio of the aromatic dibasic acid to the aliphatic dibasic acid in a dissolving and salt-forming kettle 19 remained stable. After the composition of the aforementioned saline solution was detected by an online Raman spectrometer 20, the saline solution was pressurized to 1.2 MPa by a pump 24 and then mixed with the material conveyed by a circulating pump 28 for heating before being conveyed to a preheater (heat exchanger) 27 of the dehydrator; and was dehydrated in a dehydrator 29, where the dehydration temperature was controlled at 190° C., the moisture content was controlled at 15%, and the residence time for dehydration was 30 min. As the heat source of the multi-stage stirring vessel 14, the steam from the dehydrator was cooled by a heat exchanger 15 and then the amine content therein was detected by an online Raman spectrometer 16. The amount of the molten hexamethylenediamine required to be replenished before a pump 32 was determined by a controller 21 in conjunction with the detection results from the Raman spectrometers 16 and 20; the qualified dehydrated material passed through a pump 17 and a pump 30, respectively, and the molten hexamethylenediamine and 0.06 Kg/h (1 mol/h) of acetic acid as the molecular weight regulator were used to adjust the amine/acid molar ratio to 1.01. Subsequently, the material was pressurized to 10 MPa by the pump 32 and conveyed to a preheater (heat exchanger) 33 for preheating to a temperature of 280° C., and kept at 280° C. for 5 min in a pre-polymerization reactor 34; and after being decompressed to 0.2 MPa via a reducing valve 35, the pre-polymerization solution entered a flash vaporizer 36. The molten liquid material after flashing was reduced to the atmospheric pressure via a reducing valve 37 and then entered a double-screw extruder 38 for post-polycondensation, the reaction temperature was 300 to 310° C. and the residence time for reaction was 5 min. The material after being subjected to the post-polycondensation was pelleted in an underwater pelletizer 39 and dried by a drier 40 to obtain a low-gel semi-aromatic polyamide product at about 11.8 Kg/h, which had an intrinsic viscosity (IV) of 0.92 dL/g and a gel content of 0.21%.

Example 2

In an amine/acid molar ratio of 0.92 in the initial charge, 3.32 Kg/h (20 mol/h) of terephthalic acid, 6.06 Kg/h (30 mol/h) of sebacic acid, 7.91 Kg/h (46 mol/h) of decamethylenediamine, 0.47 Kg/h of 20% aqueous solution of potassium hypophosphite and 5.46 Kg/h of water were fed together into the beating slurry vessel 9, and continuously pulped at 70° C. to form a slurry. The slurry was conveyed to the multi-stage stirring vessel 14 via the pump 10 and heated to 160° C. with the steam generated from the dehydration process to dissolve into a salt. The composition of the binary acid in the saline solution was detected by the online Raman spectrometer 18, and the amount of the aliphatic dibasic acid was adjusted by the molten sebacic acid through the metering pump 23, so that the ratio of the aromatic dibasic acid to the aliphatic dibasic acid in the dissolving and salt-forming kettle 19 remained stable. After the composition of the aforementioned saline solution was detected by the online Raman spectrometer 20, the saline solution was pressurized to 1.8 MPa by the pump 24 and then mixed with the material conveyed by the circulating pump 28 for heating before being conveyed to the preheater (heat exchanger) 27 of the dehydrator; and was dehydrated in the dehydrator 29, where the dehydration temperature was controlled at 240° C., the moisture content was controlled at 7%, and the residence time for dehydration was 15 min. As the heat source of the multi-stage stirring vessel 14, the steam from the dehydrator was cooled by the heat exchanger 15 and then the amine content therein was detected by the online Raman spectrometer 16. The amount of the molten decamethylenediamine required to be replenished before the pump 32 was determined by the controller 21 in conjunction with the detection results from the Raman spectrometers 16 and 20; the qualified dehydrated material passed through the pump 17 and the pump 30, respectively, and the molten decamethylenediamine and 0.34 Kg/h (2 mol/h) of capric acid as the molecular weight regulator were used to adjust the amine/acid molar ratio to 1.02. Subsequently, the material was pressurized to 25 MPa by the pump 32 and conveyed to the preheater (heat exchanger) 33 for preheating to a temperature of 340° C., and kept at 340° C. for 2 min in the pre-polymerization reactor 34; and after being decompressed to 0.6 MPa via the reducing valve 35, the pre-polymerization solution entered the flash vaporizer 36. The molten liquid material after flashing was reduced to the atmospheric pressure via the reducing valve 37 and then entered the double-screw extruder 38 for post-polycondensation, the reaction temperature was 320 to 330° C. and the residence time for reaction was 3 min. The material after being subjected to the post-polycondensation was pelleted in the underwater pelletizer 39 and dried by the drier 40 to obtain a low-gel semi-aromatic polyamide product at about 16.7 Kg/h, which had an IV of 0.78 dL/g and a gel content of 0.23%.

Example 3

In an amine/acid molar ratio of 0.98 in the initial charge, 6.64 Kg/h (40 mol/h) of terephthalic acid, 2.30 Kg/h (10 mol/h) of dodecanedioic acid, 5.68 Kg/h (49 mol/h) of hexamethylenediamine, 0.2 Kg/h of 20% aqueous solution of sodium phosphite and 2.42 Kg/h of water were fed together into the beating slurry vessel 9, and continuously pulped at 60° C. to form a slurry. The slurry was conveyed to the multi-stage stirring vessel 14 via the pump 10 and heated to 160° C. with the steam generated from the dehydration process to dissolve into a salt. The composition of the binary acid in the saline solution was detected by the online Raman spectrometer 18, and the amount of the aliphatic dibasic acid was adjusted by the molten dodecanedioic acid through the metering pump 23, so that the ratio of the aromatic dibasic acid to the aliphatic dibasic acid in the dissolving and salt-forming kettle 19 remained stable. After the composition of the aforementioned saline solution was detected by the online Raman spectrometer 20, the saline solution was pressurized to 1.5 MPa by the pump 24 and then mixed with the material conveyed by the circulating pump 28 for heating before being conveyed to the preheater (heat exchanger) 27 of the dehydrator; and was dehydrated in the dehydrator 29, where the dehydration temperature was controlled at 220° C. and the residence time for dehydration was 20 min. As the heat source of the multi-stage stirring vessel 14, the steam from the dehydrator was cooled by the heat exchanger 15 and then the amine content therein was detected by the online Raman spectrometer 16. The amount of the molten hexamethylenediamine required to be replenished before the pump 32 was determined by the controller 21 in conjunction with the detection results from the Raman spectrometers 16 and 20; the qualified dehydrated material passed through the pump 17 and the pump 30, respectively, and the molten hexamethylenediamine and 0.27 Kg/h (2 mol/h) of phenylacetic acid as the molecular weight regulator were used to adjust the amine/acid molar ratio to 1.04.

Subsequently, the material was pressurized to 20 MPa by the pump 32 and conveyed to the preheater (heat exchanger) 33 for preheating to a temperature of 320° C., and kept at 320° C. for 3 min in the pre-polymerization reactor 34; and after being decompressed to 0.4 MPa via the reducing valve 35, the pre-polymerization solution entered the flash vaporizer 36. The molten liquid material after flashing was reduced to the atmospheric pressure via the reducing valve 37 and then entered the double-screw extruder 38 for post-polycondensation, the reaction temperature was 310 to 320° C. and the residence time for reaction was 4 min. The material after being subjected to the post-polycondensation was pelleted in the underwater pelletizer 39 and dried by the drier 40 to obtain a low-gel semi-aromatic polyamide product at about 13.2 Kg/h, which had an IV of 0.72 dL/g and a gel content of 0.20%.

Example 4

In an amine/acid molar ratio of 0.90 in the initial charge, 4.98 Kg/h (30 mol/h) of isophthalic acid, 3.48 Kg/h (20 mol/h) of suberic acid, 9.0 Kg/h (45 mol/h) of dodecamethylenediamine, 0.15 Kg/h of 20% aqueous solution of potassium hypophosphite and 7.64 Kg/h of water were fed together into the beating slurry vessel 9, and continuously pulped at 50° C. to form a slurry. The slurry was conveyed to the multi-stage stirring vessel 14 via the pump 10 and heated to 130° C. with the steam generated from the dehydration process to dissolve into a salt. The composition of the binary acid in the saline solution was detected by the online Raman spectrometer 18, and the amount of the aliphatic dibasic acid was adjusted by the molten suberic acid through the metering pump 23, so that the ratio of the aromatic dibasic acid to the aliphatic dibasic acid in the dissolving and salt-forming kettle 19 remained stable. After the composition of the aforementioned saline solution was detected by the online Raman spectrometer 20, the saline solution was pressurized to 0.7 MPa by the pump 24 and then mixed with the material conveyed by the circulating pump 28 for heating before being conveyed to the preheater (heat exchanger) 27 of the dehydrator; and was dehydrated in the dehydrator 29, where the dehydration temperature was controlled at 170° C., the moisture content was controlled at 20%, and the residence time for dehydration was 30 min. As the heat source of the multi-stage stirring vessel 14, the steam from the dehydrator was cooled by the heat exchanger 15 and then the amine content therein was detected by the online Raman spectrometer 16. The amount of the molten dodecamethylenediamine required to be replenished before the pump 32 was determined by the controller 21 in conjunction with the detection results from the Raman spectrometers 16 and 20; the qualified dehydrated material passed through the pump 17 and the pump 30, respectively, and the molten dodecamethylenediamine and 0.05 Kg/h (0.25 mol/h) of lauric acid as the molecular weight regulator were used to adjust the amine/acid molar ratio to 1.005. Subsequently, the material was pressurized to 30 MPa by the pump 32 and conveyed to the preheater (heat exchanger) 33 for preheating to a temperature of 330° C., and kept at 330° C. for 3 min in the pre-polymerization reactor 34; and after being decompressed to 0.15 MPa via the reducing valve 35, the pre-polymerization solution entered the flash vaporizer 36. The molten liquid material after flashing was reduced to the atmospheric pressure via the reducing valve 37 and then entered the double-screw extruder 38 for post-polycondensation, the reaction temperature was 340 to 350° C. and the residence time for reaction was 0.5 min. The material after being subjected to the post-polycondensation was pelleted in the underwater pelletizer 39 and dried by the drier 40 to obtain a low-gel semi-aromatic polyamide product at about 16.7 Kg/h, which had an IV of 0.98 dL/g and a gel content of 0.27%.

Example 5

In an amine/acid molar ratio of 0.99 in the initial charge, 5.40 Kg/h (25 mol/h) of naphthalene dicarboxylic acid, 2.95 Kg/h (25 mol/h) of succinic acid, 5.74 Kg/h (49.5 mol/h) of 2-methylpentamethylenediamine, 0.25 Kg/h of a mixed aqueous solution of 10% sodium hypophosphite and 10% sodium phosphate, and 13.9 Kg/h of water were fed together into the beating slurry vessel 9, and continuously pulped at 95° C. to form a slurry. The slurry was conveyed to the multi-stage stirring vessel 14 via the pump 10 and heated to 170° C. with the steam generated from the dehydration process to dissolve into a salt. The composition of the binary acid in the saline solution was detected by the online Raman spectrometer 18. The amount of the aliphatic dibasic acid was adjusted by the molten succinic acid through the metering pump 23, so that the ratio of the aromatic dibasic acid to the aliphatic dibasic acid in the dissolving and salt-forming kettle 19 remained stable. After the composition of the aforementioned saline solution was detected by the online Raman spectrometer 20, the saline solution was pressurized to 2.0 MPa by the pump 24 and then mixed with the material conveyed by the circulating pump 28 for heating before being conveyed to the preheater (heat exchanger) 27 of the dehydrator; and was dehydrated in the dehydrator 29, where the dehydration temperature was controlled at 260° C., the moisture content was controlled at 5%, and the residence time for dehydration was 10 min. As the heat source of the multi-stage stirring vessel 14, the steam from the dehydrator was cooled by the heat exchanger 15 and then the amine content therein was detected by the online Raman spectrometer 16. The amount of the molten 2-methylpentamethylenediamine required to be replenished before the pump 32 was determined by the controller 21 in conjunction with the detection results from the Raman spectrometers 16 and 20; the qualified dehydrated material passed through the pump 17 and the pump 30, respectively, and the molten 2-methylpentamethylenediamine and 0.22 Kg/h (2.5 mol/h) of butyric acid as the molecular weight regulator were used to adjust the amine/acid molar ratio to 1.05. Subsequently, the material was pressurized to 27 MPa by the pump 32 and conveyed to the preheater (heat exchanger) 33 for preheating to a temperature of 320° C., and kept at 320° C. for 3 min in the pre-polymerization reactor 34; and after being decompressed to 0.9 MPa via the reducing valve 35, the pre-polymerization solution entered the flash vaporizer 36. The molten liquid material after flashing was reduced to the atmospheric pressure via the reducing valve 37 and then entered the double-screw extruder 38 for post-polycondensation, the reaction temperature was 320 to 330° C. and the residence time for reaction was 3 min. The material after being subjected to the post-polycondensation was pelleted in the underwater pelletizer 39 and dried by the drier 40 to obtain a low-gel semi-aromatic polyamide product at about 12.5 Kg/h, which had an IV of 0.72 dL/g and a gel content of 0.25%.

Example 6

In an amine/acid molar ratio of 0.96 in the initial charge, previously homogeneously mixed 5.81 Kg/h (35 mol/h) of terephthalic acid, 2.49 Kg/h (15 mol/h) isophthalic acid, 5.57 Kg/h (48 mol/h) of hexamethylenediamine, 0.15 Kg/h of 20% aqueous solution of sodium hypophosphite, and 6.5 Kg/h of water were fed together into the beating slurry vessel 9, and continuously pulped at 70° C. to form a slurry. The slurry was conveyed to the multi-stage stirring vessel 14 via the pump 10 and heated to 165° C. with the steam generated from the dehydration process to dissolve into a salt. The composition of the binary acid in the saline solution was detected by the online Raman spectrometer 18, and the amount of the isophthalic acid was adjusted by 50% isophthalic acid slurry through a metering pump 26, so that the ratio of the terephthalic acid to the isophthalic acid in the dissolving and salt-forming kettle 19 remained stable. After the composition of the aforementioned saline solution was detected by the online Raman spectrometer 20, the saline solution was pressurized to 1.8 MPa by the pump 24 and then mixed with the material conveyed by the circulating pump 28 for heating before being conveyed to the preheater (heat exchanger) 27 of the dehydrator; and was dehydrated in the dehydrator 29, where the dehydration temperature was controlled at 235° C., the moisture content was controlled at 8%, and the residence time for dehydration was 15 min. As the heat source of the multi-stage stirring vessel 14, the steam from the dehydrator was cooled by the heat exchanger 15 and then the amine content therein was detected by the online Raman spectrometer 16. The amount of the molten hexamethylenediamine required to be replenished before the pump 32 was determined by the controller 21 in conjunction with the detection results from the Raman spectrometers 16 and 20; the qualified dehydrated material passed through the pump 17 and the pump 30, respectively, and the molten hexamethylenediamine and 0.11 Kg/h (1.5 mol/h) of propionic acid as the molecular weight regulator were used to adjust the amine/acid molar ratio to 1.025. Subsequently, the material was pressurized to 25 MPa by the pump 32 and conveyed to the preheater (heat exchanger) 33 for preheating to a temperature of 330° C., and kept at 330° C. for 2.5 min in the pre-polymerization reactor 34; and after being decompressed to 0.3 MPa via the reducing valve 35, the pre-polymerization solution entered the flash vaporizer 36. The molten liquid material after flashing was reduced to the atmospheric pressure via the reducing valve 37 and then entered the double-screw extruder 38 for post-polycondensation, the reaction temperature was 330 to 340° C. and the residence time for reaction was 2 min. The material after being subjected to the post-polycondensation was pelleted in the underwater pelletizer 39 and dried by the drier 40 to obtain a low-gel semi-aromatic polyamide product at about 12.4 Kg/h, which had an IV of 0.77 dL/g and a gel content of 0.20%.

Comparative Example 1

In an amine/acid molar ratio of 1.01 in the initial charge, 33.2 Kg (200 mol) of terephthalic acid, 29.2 Kg (200 mol) of adipic acid, 44.1 Kg (408 mol) of hexamethylenediamine, 0.31 Kg of 20% aqueous solution of sodium hypophosphite, 0.48 Kg (8 mol) of acetic acid as the molecular weight regulator, and 25.6 Kg of water were fed together into a salt-forming kettle 41 or 42 (switched every 8 hours), and heated to 150° C. to dissolve into a salt. After being pressurized to 1.2 MPa at a flow of 16.6 Kg/h via a pump 43, the aforementioned saline solution was mixed with the material conveyed by a circulating pump 45 for heating before being conveyed to a preheater (heat exchanger) 44 of the dehydrator; and was dehydrated in a dehydrator 46, where the dehydration temperature was controlled at 190° C., the moisture content was controlled at 15%, and the residence time for dehydration was 30 min; the qualified dehydrated material was pressurized to 10 MPa by a pump 48 and conveyed to a preheater (heat exchanger) 49 for preheating to a temperature of 280° C., and kept at 280° C. for 5 min in a pre-polymerization reactor 50; and after being decompressed to 0.2 MPa via a reducing valve 51, the pre-polymerization solution entered a flash vaporizer 52. The molten liquid material after flashing was reduced to the atmospheric pressure and then entered a double-screw extruder 54 for post-polycondensation, the reaction temperature was 300 to 310° C. and the residence time for reaction was 5 min. The material after being subjected to the post-polycondensation was pelleted in an underwater pelletizer 55 and dried by a drier 56 to obtain a semi-aromatic polyamide product at about 11.6 Kg/h, which had an IV of 0.98 dL/g and a gel content of 1.03%.

Comparative Example 2

In an amine/acid molar ratio of 1.02 in the initial charge, 26.6 Kg (160 mol) of terephthalic acid, 48.5 Kg (240 mol) of sebacic acid, 71.6 Kg (416 mol) of decamethylenediamine, 3.75 Kg of 20% aqueous solution of potassium hypophosphite, 2.75 Kg (16 mol) of capric acid as the molecular weight regulator, and 43.7 Kg of water were fed together into the salt-forming kettle 41 or 42 (switched every 8 hours), and heated to 160° C. to dissolve into a salt. After being pressurized to 1.8 MPa at a flow of 24.0 Kg/h via the pump 43, the aforementioned saline solution was mixed with the material conveyed by the circulating pump 45 for heating before being conveyed to the preheater (heat exchanger) 44 of the dehydrator; and was dehydrated in the dehydrator 46, where the dehydration temperature was controlled at 240° C., the moisture content was controlled at 7%, and the residence time for dehydration was 15 min; the qualified dehydrated material was pressurized to 25 MPa by the pump 48 and conveyed to the preheater (heat exchanger) 49 for preheating to a temperature of 340° C., and kept at 340° C. for 2 min in the pre-polymerization reactor 50; and after being decompressed to 0.6 MPa via the reducing valve 51, the pre-polymerization solution entered the flash vaporizer 52. The molten liquid material after flashing was reduced to the atmospheric pressure and then entered the double-screw extruder 54 for post-polycondensation, the reaction temperature was 320 to 330° C. and the residence time for reaction was 3 min. The material after being subjected to the post-polycondensation was pelleted in the underwater pelletizer 55 and dried by the drier 56 to obtain a semi-aromatic polyamide product at about 16.6 Kg/h, which had an IV of 0.81 dL/g and a gel content of 1.12%.

Comparative Example 3

In an amine/acid molar ratio of 1.04 in the initial charge, 53.1 Kg (320 mol) of terephthalic acid, 18.4 Kg (80 mol) of dodecanedioic acid, 49.2 Kg (424 mol) of hexamethylenediamine, 1.6 Kg of 20% aqueous solution of sodium phosphite, 2.18 Kg (16 mol) of phenylacetic acid as the molecular weight regulator, and 19.4 Kg of water were fed together into the salt-forming kettle 41 or 42 (switched every 8 hours), and heated to 160° C. to dissolve into a salt. After being pressurized to 1.5 MPa at a flow of 18.0 Kg/h via the pump 43, the aforementioned saline solution was mixed with the material conveyed by the circulating pump 45 for heating before being conveyed to the preheater (heat exchanger) 44 of the dehydrator; and was dehydrated in the dehydrator 46, where the dehydration temperature was controlled at 220° C. and the residence time for dehydration was 20 min; the qualified dehydrated material was pressurized to 20 MPa by the pump 48 and conveyed to the preheater (heat exchanger) 49 for preheating to a temperature of 320° C., and kept at 320° C. for 3 min in the pre-polymerization reactor 50; and after being decompressed to 0.4 MPa via the reducing valve 51, the pre-polymerization solution entered the flash vaporizer 52. The molten liquid material after flashing was reduced to the atmospheric pressure and then entered the double-screw extruder 54 for post-polycondensation, the reaction temperature was 310 to 320° C. and the residence time for reaction was 4 min. The material after being subjected to the post-polycondensation was pelleted in the underwater pelletizer 55 and dried by the drier 56 to obtain a semi-aromatic polyamide product at about 13.0 Kg/h, which had an IV of 0.78 dL/g and a gel content of 2.51%.

Comparative Example 4

In an amine/acid molar ratio of 1.005 in the initial charge, 39.8 Kg (240 mol) of isophthalic acid, 27.8 Kg (160 mol) of suberic acid, 80.6 Kg (403 mol) of dodecamethylenediamine, 1.2 Kg of 20% aqueous solution of potassium hypophosphite, 0.4 Kg (2 mol) of lauric acid as the molecular weight regulator, and 61.1 Kg of water were fed together into the salt-forming kettle 41 or 42 (switched every 8 hours), and heated to 130° C. to dissolve into a salt. After being pressurized to 0.7 MPa at a flow of 26.4 Kg/h via the pump 43, the aforementioned saline solution was mixed with the material conveyed by the circulating pump 45 for heating before being conveyed to the preheater (heat exchanger) 44 of the dehydrator; and was dehydrated in the dehydrator 46, where the dehydration temperature was controlled at 170° C., the moisture content was controlled at 20%, and the residence time for dehydration was 30 min; the qualified dehydrated material was pressurized to 30 MPa by the pump 48 and conveyed to the preheater (heat exchanger) 49 for preheating to a temperature of 330° C., and kept at 330° C. for 3 min in the pre-polymerization reactor 50; and after being decompressed to 0.15 MPa via the reducing valve 51, the pre-polymerization solution entered the flash vaporizer 52. The molten liquid material after flashing was reduced to the atmospheric pressure and then entered the double-screw extruder 54 for post-polycondensation, the reaction temperature was 340 to 350° C. and the residence time for reaction was 0.5 min. The material after being subjected to the post-polycondensation was pelleted in the underwater pelletizer 55 and dried by the drier 56 to obtain a semi-aromatic polyamide product at about 16.6 Kg/h, which had an IV of 1.02 dL/g and a gel content of 0.97%.

Comparative Example 5

In an amine/acid molar ratio of 1.05 in the initial charge, 43.2 Kg (200 mol) of naphthalene dicarboxylic acid, 23.6 Kg (200 mol) of succinic acid, 49.9 Kg (430 mol) of 2-methylpentamethylenediamine, 2 Kg of a mixed aqueous solution of 10% sodium hypophosphite and 10% sodium phosphate, 1.76 Kg (20 mol) of butyric acid as the molecular weight regulator, and 111.1 Kg of water were fed together into the salt-forming kettle 41 or 42 (switched every 8 hours), and heated to 170° C. to dissolve into a salt. After being pressurized to 2.0 MPa at a flow of 28.9 Kg/h via the pump 43, the aforementioned saline solution was mixed with the material conveyed by the circulating pump 45 for heating before being conveyed to the preheater (heat exchanger) 44 of the dehydrator; and was dehydrated in the dehydrator 46, where the dehydration temperature was controlled at 260° C., the moisture content was controlled at 5%, and the residence time for dehydration was 10 min; the qualified dehydrated material was pressurized to 27 MPa by the pump 48 and conveyed to the preheater (heat exchanger) 49 for preheating to a temperature of 320° C., and kept at 320° C. for 3 min in the pre-polymerization reactor 50; and after being decompressed to 0.9 MPa via the reducing valve 51, the pre-polymerization solution entered the flash vaporizer 52. The molten liquid material after flashing was reduced to the atmospheric pressure and then entered the double-screw extruder 54 for post-polycondensation, the reaction temperature was 320 to 330° C. and the residence time for reaction was 3 min. The material after being subjected to the post-polycondensation was pelleted in the underwater pelletizer 55 and dried by the drier 56 to obtain a semi-aromatic polyamide product at about 12.4 Kg/h, which had an IV of 0.79 dL/g and a gel content of 2.35%.

Comparative Example 6

In an amine/acid molar ratio of 1.025 in the initial charge, previously homogeneously mixed 46.5 Kg (280 mol) of terephthalic acid, 19.9 Kg (120 mol) of isophthalic acid, 48.3 Kg (416 mol) of hexamethylenediamine, 1.2 Kg of 20% aqueous solution of sodium hypophosphite, 0.89 Kg (12 mol) of propionic acid as the molecular weight regulator, and 52 Kg of water were fed together into the salt-forming kettle 41 or 42 (switched every 8 hours), and heated to 165° C. to dissolve into a salt. After being pressurized to 1.8 MPa at a flow of 19.3 Kg/h via the pump 43, the aforementioned saline solution was mixed with the material conveyed by the circulating pump 45 for heating before being conveyed to the preheater (heat exchanger) 44 of the dehydrator; and was dehydrated in the dehydrator 46, where the dehydration temperature was controlled at 235° C., the moisture content was controlled at 8%, and the residence time for dehydration was 15 min; the qualified dehydrated material was pressurized to 25 MPa by the pump 48 and conveyed to the preheater (heat exchanger) 49 for preheating to a temperature of 330° C., and kept at 330° C. for 2.5 mm in the pre-polymerization reactor 50; and after being decompressed to 0.3 MPa via the reducing valve 51, the pre-polymerization solution entered the flash vaporizer 52. The molten liquid material after flashing was reduced to the atmospheric pressure and then entered the double-screw extruder 54 for post-polycondensation, the reaction temperature was 330 to 340° C. and the residence time for reaction was 2 min. The material after being subjected to the post-polycondensation was pelleted in the underwater pelletizer 55 and dried by the drier 56 to obtain a semi-aromatic polyamide product at about 12.2 Kg/h, which had an IV of 0.83 dL/g and a gel content of 1.60%.

By comparing the examples to the comparative examples in the present disclosure, it is clear that a semi-aromatic polyamide having a low gel content can be obtained by the method according to the present disclosure. At the same time, since the steam generated from the dehydration procedure is used for the heating of the dissolving and salt-forming process in the present disclosure, the energy consumption can be reduced; the excessive steam can be combined after condensation with the condensate generated from the heating procedure as supplementary water for use in the procedure of forming a slurry, thereby reducing the discharge of process wastewater. In addition, the multi-channel online Raman spectroscopy was used in the present disclosure to continuously determine the content of each component quantitatively at an amine/acid ratio of less than 1.0 according to the characteristic Raman absorption peaks of different raw materials, so as to continuously adjust the proportion of raw materials and achieve the continuous production.

The invention claimed is:

1. A production method of a semi-aromatic polyamide, comprising:
    step 1 forming a slurry by combining an initial charge of a diamine and a binary acid in an amine/acid molar ratio of less than 1.0 together with water and a catalyst, and subjecting the slurry to heating and dissolution to form a saline solution,
    step 2 dehydrating said saline solution after detecting the composition thereof, detecting the content of diamine in a steam condensate from a dehydration unit, adjusting the amine/acid molar ratio to be larger than 1.0 by diamine and a monoacid as a molecular weight regulator, and performing pre-polymerization, and
    subjecting a pre-polymerization solution to post-polycondensation after vacuum flashing,
    wherein the temperature of the dehydration is 170-260° C., the pressure of the dehydration is 0.7-2.0 MPa, and the dehydration time is 10-40 min; the temperature of said pre-polymerization is 250-350 C., the pressure of said pre-polymerization is 10-30 MPa, and the reaction time is 1-15 min; the reaction temperature of said post-polycondensation is 300-350° C., and the reaction time is 0.5-5 min.

2. The method according to claim 1, wherein the amine/acid molar ratio of the initial charge in said step 1 is from 0.90 to 0.99.

3. The method according to claim 1, wherein said binary acid comprises aromatic dibasic acid and aliphatic dibasic acid, the molar ratio of said aromatic dibasic acid to said aliphatic dibasic acid is 100:0 to 40:60.

4. The method according to claim 3, wherein said aliphatic dibasic acid is one or more selected from succinic acid, glutaric acid, adipic acid, suberic acid, azelaic acid, sebacic acid and dodecanedioic acid; and said aromatic dibasic acid is one or more selected from isophthalic acid, terephthalic acid and naphthalene dicarboxylic acid.

5. The method according to claim 1, wherein said diamine is one or more selected from hexamethylenediamine, heptamethylenediamine, octamethylenediamine, nonamethylenediamine, decamethylenediamine, 2-methylpentamethylenediamine, undecamethylenediamine, dodecamethylenediamine and xylylenediamine, preferably, said diamine is one or more selected from hexamethylenediamine, octamethylenediamine and decamethylenediamine.

6. The method according to claim 1, wherein said monoacid as the molecular weight regulator is one or more selected from acetic acid, propionic acid, butyric acid, valeric acid, caproic acid, octanoic acid, capric acid, lauric acid, palm acid, palmitic acid, stearic acid, benzoic acid and phenylacetic acid.

7. The method according to claim 1, wherein the mole number of said monoacid as the molecular weight regulator is from 0.1 to 5% relative to the total mole number of the binary acid in the initial charge.

8. The method according to claim 1, wherein the mass of said catalyst is from 0.01 to 2.5% relative to the total mass of the binary acid in the initial charge.

9. The method according to claim 1, wherein said step 1 further comprises a step of detecting the composition of the binary acid in said saline solution and keeping the composition of the binary acid stable by adding an aromatic dibasic acid and/or an aliphatic dibasic acid.

10. The method according to claim 9, wherein the detection in said step 1 uses online Raman spectroscopy.

11. The method according to claim 1, wherein the detection in said step 2 uses online Raman spectroscopy.

12. The method according to claim 1, wherein the amine/acid molar ratio in said step 2 is from 1.005 to 1.05.

13. The method according to claim 1, wherein steam generated from a dehydration procedure in said step 2 can be used as a heat source for the heating and dissolution of a slurry, and excessive steam can be combined after condensation with a condensate generated from a heating process as supplementary water for use in a procedure of forming a slurry.

14. The method according to claim 9, wherein the detection in said step 2 uses online Raman spectroscopy.

15. The method according to claim 2, wherein the amine/acid molar ratio of the initial charge in said step 1 is from 0.92 to 0.98.

16. The method according to claim 3, wherein the molar ratio of said aromatic dibasic acid to said aliphatic dibasic acid is 100:0 to 50:50.

* * * * *